April 21, 1925. 1,534,054
G. H. CLEVENGER
PROCESS FOR SYNTHETIC MANUFACTURE OF CYANIDE
Filed Sept. 6, 1921
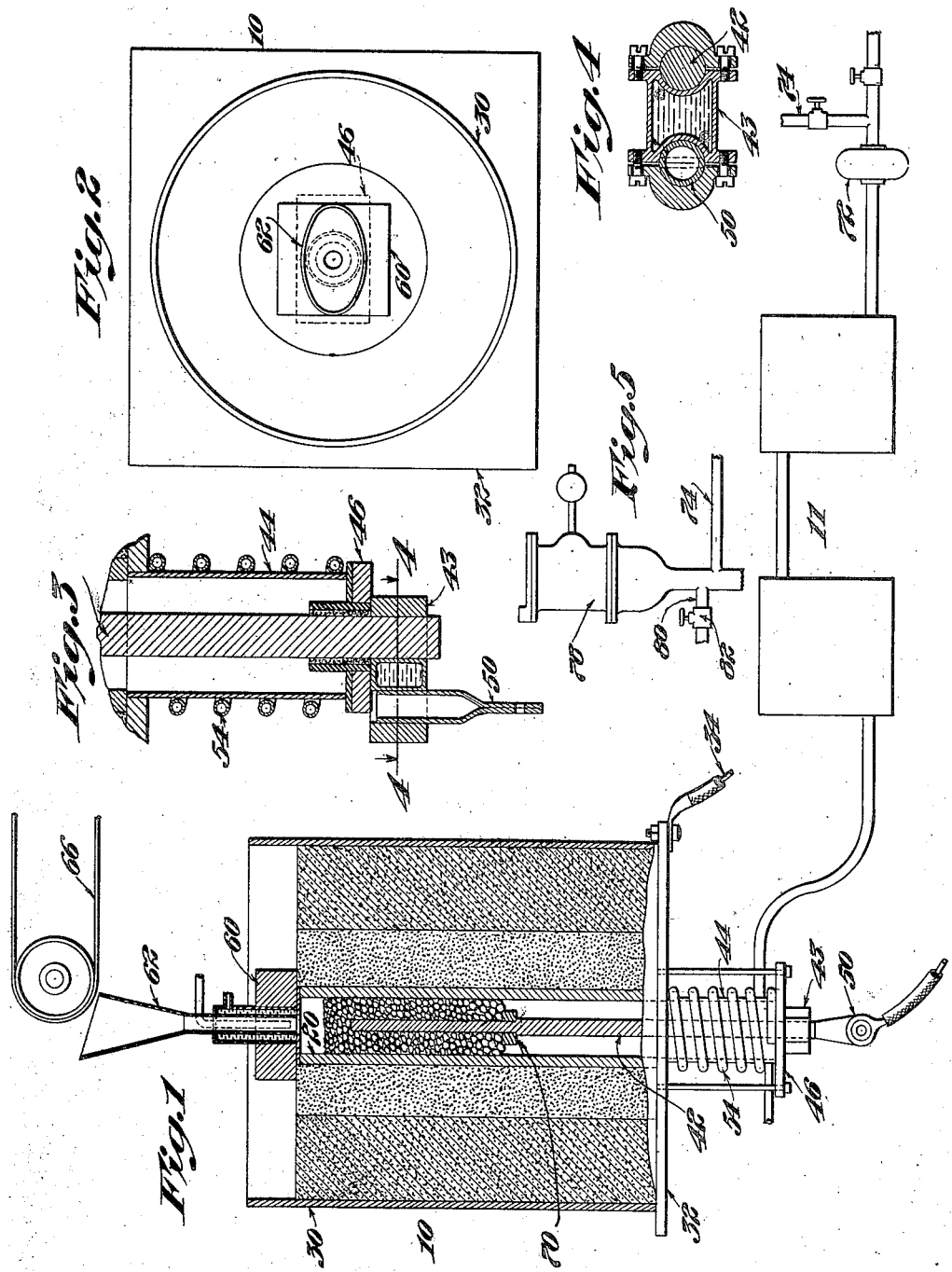

Patented Apr. 21, 1925.

1,534,054

UNITED STATES PATENT OFFICE.

GALEN H. CLEVENGER, OF BROOKLINE, MASSACHUSETTS, ASSIGNOR TO UNITED STATES SMELTING, REFINING & MINING COMPANY, OF PORTLAND. MAINE, A CORPORATION OF MAINE.

PROCESS FOR SYNTHETIC MANUFACTURE OF CYANIDE.

Application filed September 6, 1921. Serial No. 498,731.

*To all whom it may concern:*

Be it known that I, GALEN H. CLEVENGER, a citizen of the United States, residing at Brookline, in the county of Norfolk and State of Massachusetts, have invented certain new and useful Improvements in Processes for Synthetic Manufacture of Cyanide; and I do hereby declare the following to be a full, clear, and exact description of the invention, such as will enable others skilled in the art to which it appertains to make and use the same.

This invention relates to a process for the synthetic production of cyanides.

The present process for synthetically producing cyanides is based upon the reaction of nitrogen and incandescent carbon with a metallic compound to produce a metal cyanide. Prior to the present invention many attempts have been made to produce cyanide in accordance with this general reaction but, as far as I am aware, by none of the proposed methods has cyanide been produced with sufficient efficiency to sustain commercial operation.

The presence of any oxidizing gas, such as oxygen or carbon dioxide, in the nitrogenous atmosphere in which cyanide is formed, operates, at the high temperature which is required for the production of cyanide, to decompose the cyanide which may be produced and also to retard the cyanide producing reaction or prevent its completion. The object of the present invention is to continuously produce and remove cyanide from the reaction zone, in an atmosphere free from such oxidizing gases.

The present process contemplates the continuous production of cyanide by passing a stream of intermingled nitrogenous gas and vaporized metallic compound through a mass or zone of incandescent carbonaceous material which extends entirely across the path of flow of the gas and vapor, and maintaining a rate of gas flow and a temperature throughout the zone which preclude the existence of oxygen or carbon dioxide within the zone and within the gases issuing therefrom. All of the vaporized metallic compound is therefore brought into intimate contact with incandescent carbon in a nitrogenous atmosphere free from oxygen or carbon dioxide and containing only carbon monoxide and other inert gases which have no decomposing action upon the cyanide produced, and the cyanide is continuously removed in the same inert atmosphere. The metallic compound may be and preferably is vaporized by feeding it to an incandescent bed of carbonaceous material within which the highly heated reaction zone is maintained, and the carbon consumed is replaced by the addition of fresh carbonaceous material, which may conveniently be fed to the bed with the metallic compound.

To prevent the existence of carbon dioxide in the reaction zone and in the reaction gases issuing therefrom, the temperature throughout the reaction zone should be maintained in the neighborhood of 1400 degrees C. or even higher. At such high temperatures should any carbon dioxide be formed it will be immediately converted into carbon monoxide, a gas which is inert toward the cyanide producing reaction, in accordance with the equilibrium between carbon, carbon dioxide and carbon monoxide at the high temperature. The nitrogenous gas should be passed through the reaction zone at a rate which will give the excess of nitrogen requisite for the best reaction conditions and which will also permit any oxygen contained in the gas to be converted into carbon monoxide as the gas passes into the reaction zone so that a nitrogenous atmosphere substantially free from oxygen is maintained in the reaction zone and in the reaction gases issuing therefrom.

It is important that the reaction products be removed from the carbonaceous bed at a rate to prevent the accumulation of cyanide vapor, which would tend to retard the production of cyanide. As the cyanide producing reaction progresses, and a portion of the carbon in the carbonaceous bed is consumed by the reaction, the additional carbonaceous material supplied maintains a substantially uniform bed. The reaction products containing the cyanide chiefly in the form of a vapor or fog, which are continuously removed from the carbonaceous bed, are thereafter treated to separate the cyanide in any suitable manner.

A part of the excess nitrogen which remains in the gases withdrawn from the reaction zone after the cyanide has been removed may with advantage be returned to the reaction zone to supply a part of the excess in subsequent reactions, and thus reduce the amount of nitrogenous gas consumed during the continuance of the process. In case air or other oxygen containing gas is utilized as the nitrogenous gas the amount of carbonaceous material consumed during the continuance of the process will also be reduced owing to the absence of oxygen in the returned gases.

This method of producing the cyanide permits metal carbonates or other compounds which yield carbon dioxide upon being heated, to be employed in the process, any carbon dioxide resulting from their decomposition being immediately converted into carbon monoxide. Furthermore, it permits air to be used as the nitrogenous gas. In such case the air passes through the carbonaceous bed, carbon monoxide is produced and should any carbon dioxide be formed it is immediately converted into carbon monoxide in accordance with the equilibrium conditions above mentioned. In case air or other nitrogenous gas containing oxygen is employed, the rate of flow thereof should be so regulated as to afford ample opportunity for all of the oxygen contained therein to be converted to carbon monoxide as the air passes into the reaction zone. Should any appreciable amounts of oxygen be permitted to exist in the atmosphere in which the cyanide is formed or in the products of the reaction, practically all of the cyanide would be decomposed.

Any suitable apparatus may be utilized in practicing the process and in the drawing apparatus which is well adapted for this purpose is shown. In the drawings, Fig. 1 is an elevation, a portion of the furnace being shown in section; Fig. 2 is a plan of the furnace; Fig. 3 is a sectional detail of the lower portion thereof; Fig. 4 is a section on the line 4—4 of Fig. 3; and Fig. 5 is a view showing a modified form of feeder for the carbonacious material and metallic compound.

Referring to the drawing, the apparatus illustrated therein comprises, in general, an electric furnace 10, within which the cyanide is produced and apparatus 11 connected therewith for separating the cyanide from the gaseous products of the cyanide producing reaction. The furnace 10 is provided with a reaction chamber filled with a bed of carbonaceous material. A stream of intermingled nitrogenous gas and vaporized metallic compound is caused to flow through the carbonaceous bed and the latter is maintained throughout at a temperature precluding the existence of carbon dioxide therein and in the reaction gases issuing therefrom. The preferred method of obtaining the requisite uniform temperature throughout the carbonaceous bed comprises the passage of an electric current through the bed and transversely of the gas flow by means of opposed electrodes comprising bounding walls of the reaction chamber. In the furnace illustrated, the bed is annular and is included between electrodes within and surrounding the same. The outer electrode comprises the body of the furnace and is made up of three concentric sections, the inner comprising a graphite tube or cylinder 20, the outer fire brick, and the intermediate section, a ring of baked carbonaceous material. The composite body portion is enclosed within a steel shell 30, and the bottom thereof is closed by a steel plate 32, welded to the lower end of the steel shell. Power is supplied to the body portion through a connector 34, bolted, as shown, to the steel plate 32.

The second electrode of the furnace comprises a graphite rod 42 extended upwardly into the reaction chamber through the interior of the carbonaceous bed and terminated some distance from the top thereof. The graphite rod 42 is supported by and secured at its lower end in an electrode holder 43 mounted in a pipe 44, extended downwardly from the bottom of the furnace and forming a continuation of the reaction chamber itself. A steel plate 46, bolted to the bottom of the furnace, as shown in Fig. 1, serves to hold the electrode holder 43 and pipe 44 in place. Suitable packing, preferably asbestos, between the graphite rod 42 and the electrode holder maintains a vapor tight joint at this point. The electrode holder 43 is provided with a power connector 50, and suitable provision is made for water cooling, illustrated diagrammatically in the drawing, by the pipe connection 54. The upper end of the reaction chamber of the furnace is closed by a heavy graphite block 60 through which a funnel shaped hopper 62 is extended, being suitably water cooled, and through which the raw materials are fed from a continuous conveyor 66 to the furnace. The carbonaceous bed within the reaction chamber may be supported in any suitable manner, that therein shown comprising a graphite grate 70, secured upon the graphite rod 42, comprising the second electrode of the furnace.

The process may be utilized in the production of various metallic cyanides and will be further described with reference to the production of sodium cyanide from sodium carbonate which owing to its cheapness may be utilized with advantage. In operation the bed of carbonaceous material is initially heated to a uniformly high temperature in the neighborhood of 1400 degrees C. by a passage of current from the outer electrode of the furnace surrounding the bed to the inner electrode around which the bed is formed, the power connectors 34 and 54 being connected to a suitable source of electric power. The arrangement of the electrodes with respect to the carbonaceous bed enables the bed to be heated uniformly. In practice when furnaces of large size are employed the upper portions of the bed may be slightly cooler than the lower portions, but all of the bed between the opposed surfaces of the electrodes and in the path of the stream of nitrogenous gas is maintained during the continued operation of the process at temperatures precluding the existence of carbon dioxide within the reaction zone. All of the nitrogenous gas is caused to pass through this portion of the bed included between the opposed surfaces of the electrodes and maintained at the requisite temperature to preclude the existence of carbon dioxide. In practice air is preferably employed as the source of nitrogen and is drawn downwardly by suction, through the hopper at the top of the furnace, although other nitrogenous gases may be employed. The sodium carbonate (or other metallic compound) together with sufficient carbonaceous material, preferably charcoal, to compensate for the consumption of carbon by the cyanide producing reaction, is fed by the conveyor 66 to the upper end of the hopper whence they fall downwardly upon the top of the carbon bed. In furnaces of larger size it may be desirable to provide means for insuring for the uniform distribution of the sodium carbonate and charcoal over the top of the carbonaceous bed.

The sodium carbonate deposited upon the incandescent bed is volatilized and the vapors pass downwardly therethrough together with the nitrogenous gas. In the upper strata of the bed the incandescent carbon combines with the oxygen of the air and is burned to carbon monoxide, the temperature throughout the cross-sectional area of the bed being such that the combustion proceeds to the formation of only carbon monoxide, so that practically no carbon dioxide exists in the gases within that part of the bed within which the cyanide producing reactions take place or within the gases leaving the bed. Any moisture in the air is decomposed by the incandescent carbon into carbon monoxide and hydrogen, so that ordinarily in practice the entire gas stream flowing through the reaction zone of the bed comprises essentially nitrogen with which is associated carbon monoxide and a small quantity of hydrogen, both of the latter being inert toward the cyanide producing reaction.

The general course of the cyanide producing reaction is believed to be as follows: The sodium carbonate and carbon first combine to produce metallic sodium which reacts as it is formed with additional incandescent carbon to form sodium carbide. The sodium carbide itself then combines with the nitrogen to form sodium cyanide, the latter being swept downwardly out of the reaction zone by the downward current of gases. The reactions involved are believed to be as follows:

$$Na_2CO_3 + 2C = 2Na + 3CO$$
$$2Na + 2C = Na_2C_2$$
$$Na_2C_2 + N_2 = 2NaCN$$

During the operation of the process the carbon consumed by the cyanide producing reaction from the reacting bed is replenished, additional charcoal or other carbonaceous material being preferably fed onto the bed along with the sodium carbonate so that at all times a definite length and size of reacting bed is maintained.

At the high temperatures in the neighborhood of 1400 degrees C. or higher, at which the present process is operated, practically all of the cyanide formed exists in the form of a vapor with which is associated considerable quantities of carbon monoxide and nitrogen. The cyanide may be recovered in any suitable manner. As indicated the gases pass through a suitable condensing and filtration apparatus indicated at 11 by which the cyanide is recovered in a solid condition. From the condensing and filtration apparatus the gases freed from the cyanide pass through the suction device indicated at 72 which draws the gases through the furnace and through the condensing and filtration apparatus and discharges them through the pipe 74. A regulated part of the gases discharged through the pipe 74 may be taken away through a bronze pipe 76 and again passed through the furnace. In such case the carbonaceous material and metallic compound are supplied to the furnace through a closed feeder indicated at 78. In Fig. 5 and the air is admitted through a pipe 80 provided with a regulating valve 82.

In some instances, particularly when furnaces of considerable size are employed, a small proportion of the cyanide may condense in the lower part of the furnace and in such a case may be withdrawn at intervals through a suitable tap. In the preferred method of operation, however, the invention contemplates the utilization of a sufficiently high temperature produced by an electric furnace of such design that all of the cyanide in the form of a vapor is swept from the furnace with the gaseous products of the reaction into the condensing and filtering apparatus.

If the above described conditions of temperature within the carbonaceous bed are maintained, then during the operation of the process by properly regulating the rate at which the sodium carbonate or other metallic compound is fed into the reaction zone, with relation to the rate of flow of the nitrogenous gas therethrough and further with relation to the dimensions of the bed of the carbonaceous material itself, reaction products may be obtained substantially free from undecomposed sodium carbonate, and also substantially free from metallic sodium or sodium carbide. Under the most favorable reaction conditions even the alkali contained as an impurity in the charcoal is volatilized and converted into cyanide. If the most advantageous relations between the rates at which the sodium carbonate and nitrogen are fed, with relation to the dimensions of the carbonaceous bed are not maintained, then the efficiency of the process will be diminished and increasing quantities of metallic sodium and sodium carbide will be found in the resulting products of the reaction and will accumulate partly in the furnace, and partly in the resulting cyanide. Of course the actual rates at which the nitrogenous gas and the sodium carbonate may be most advantageously fed to a furnace will depend upon the size and design of the furnace. I have found that satisfactory results may be secured by feeding the sodium carbonate and air or other nitrogenous gas at rates such that approximately 4 pounds of sodium carbonate are consumed per hour per cubic foot of carbonaceous bed, and approximately 550 cubic feet of gaseous products per hour per cubic foot of bed are withdrawn.

Any traces of carbon dioxide or oxygen which may exist will tend to decompose the cyanide formed with a corresponding reduction in the efficiency of the process and any substantial amount of such gases either in the reaction zone or in the reaction gases issuing therefrom will so reduce the efficiency of the process as to seriously impair or destroy its practical utility. The phrase "to preclude the existence" is therefore used throughout the specification and claims as meaning to preclude the existence of substantial amounts of such oxidizing gases.

Having thus described the invention what is claimed is:—

1. The process of synthetically producing cyanide which consists in passing a stream of intermingled nitrogenous gas and vaporized metallic compound through a mass or zone of incandescent carbonaceous material, which extends completely across the path of flow of the gas, maintaining a temperature throughout the zone which precludes the existence of carbon dioxide therein and in the reaction gases issuing therefrom, supplying fresh carbonaceous material to replace the carbon consumed and continuously removing the products of the reaction.

2. The process of synthetically producing cyanide which consists in passing a stream of intermingled nitrogenous gas and vaporized metallic compound through a mass or zone of incandescent carbonaceous material, which extends completely across the path of flow of the gas and vapor, maintaining a rate of flow of the gas and a temperature throughout the zone which preclude the existence of oxygen or carbon dioxide in the zone and in the reaction gases issuing therefrom, supplying fresh carbonaceous material to replace the carbon consumed and continuously removing the products of the reaction.

3. The process for synthetically producing cyanide which consists in feeding a metallic compound to an incandescent bed of carbonaceous material, passing nitrogenous gas through the bed, maintaining a zone within the bed through which all the gas and vaporized metallic compound passes at a temperature precluding the existence of carbon dioxide therein and in the reaction gases issuing therefrom, supplying carbonaceous material to replace the carbon consumed and continuously removing the reaction products.

4. The process for synthetically producing cyanide which consists in feeding a metallic compound to an incandescent bed of carbonaceous material, passing nitrogenous gas through the bed, maintaining a zone within the bed through which all the gas and vaporized metallic compound passes, maintaining a rate of flow of the gas and a temperature throughout the zone which preclude the existence of carbon dioxide or oxygen therein or in the reaction gases issuing therefrom, supplying carbonaceous material to replace the carbon consumed and continuously removing the reaction products.

5. The process of synthetically producing cyanide which consists in passing a stream of intermingled nitrogenous gas and vaporized metallic compound through a mass or zone of incandescent carbonaceous material extended completely across the path of flow of the gas and vapor, maintaining the mass or zone of carbonaceous material by the passage therethrough of an electric current, at a temperature precluding the existence of carbon dioxide therein and in the reaction gases issuing therefrom, supplying carbonaceous material to replace the carbon consumed and continuously removing the reaction products.

6. The process for synthetically producing cyanide which consists in causing a stream of intermingled nitrogenous gas and vaporized metallic compound to flow through a passage filled with carbonaceous material, passing a current of electricity through the carbonaceous material transversely of the gas flow by means of opposed electrodes comprising bounding walls of the passage to thereby heat the entire bed of carbonaceous material to a temperature precluding the existence of carbon dioxide therein and in the reaction gases issuing therefrom, supplying carbonaceous material to replace the carbon consumed and continuously removing the reaction products.

7. The process of synthetically producing cyanide which consists in passing a stream of intermingled nitrogenous gas and vaporized sodium carbonate through a mass or zone of incandescent carbonaceous material, which extends completely across the path of flow of the gas, maintaining a temperature throughout the zone which precludes the existence of carbon dioxide therein and in the reaction gases issuing therefrom, supplying fresh carbonaceous material to replace the carbon consumed and continuously removing the products of the reaction.

8. The process of synthetically producing cyanide which consists in passing a stream of intermingled nitrogenous gas and a vaporized sodium carbonate through a mass or zone of incandescent carbonaceous material which extends completely across the path of flow of the gas and vapor, maintaining a rate of flow of the gas and a temperature in the zone to preclude the existence of oxygen or carbon dioxide in the zone and in the reaction gases issuing therefrom, supplying fresh carbonaceous material to replace the carbon consumed and continuously removing the products of the reaction.

9. The process of synthetically producing cyanide which consists in passing a stream of intermingled air and vaporized sodium carbonate through a mass or zone of incandescent carbonaceous material which extends completely across the path of flow of the gas and vapor, maintaining a rate of flow of the gas and a temperature in the zone as to preclude the existence of oxygen or carbon dioxide in the zone and in the reaction gases issuing therefrom, supplying fresh carbonaceous material to replace the carbon consumed, and continuously removing the products of the reaction.

10. The process of synthetically producing sodium cyanide which consists in feeding sodium carbonate to an incandescent bed of carbonaceous material, passing a stream of air through the bed, passing a current of electricity through the bed to maintain a zone therein included between opposed surfaces of the electrodes and through which all of the air and vaporized sodium carbonate passes, at a temperature precluding the existence of carbon dioxide therein and in the reaction gases issuing therefrom, supplying fresh carbonaceous material to replace the carbon consumed and continuously removing the products of the reaction.

11. The process of synthetically producing sodium cyanide which consists in feeding sodium carbonate to an incandescent bed of carbonaceous material, passing a stream of air through the bed, maintaining a rate of flow of the air and a temperature in a zone of the bed included between the opposed surfaces of electrodes and through which all of the air passes, to preclude the existence of carbon dioxide or oxygen therein and in the reaction gases issuing therefrom, by the passage through the zone of a current of electricity, supplying fresh carbonaceous material to replace the carbon consumed and continuously removing the products of the reaction.

12. The process of synthetically producing sodium cyanide which consists in feeding a metallic compound to a bed of carbonaceous material, heated to incandescence by the passage therethrough of a current of electricity from electrodes within and surrounding the same, passing a stream of nitrogenous gas through the zone between the electrodes, maintaining a rate of flow of the gas and a temperature in the zone to preclude the existence of carbon dioxide or oxygen within the zone or in the reaction gases issuing therefrom, supplying fresh carbonaceous material to replace the carbon consumed and continuously removing the products of the reaction.

13. The process of synthetically producing cyanide which consists in passing a stream of intermingled nitrogen gas and vaporized metallic compound through a mass of incandescent carbonaceous material at a rate to maintain an excess of nitrogen in the reaction zone, supplying fresh carbonaceous material to replace the carbon consumed, continuously removing the gaseous products from the reaction zone, separating the cyanide from the products, and repassing a part of the remaining gases through the reaction zone.

14. The process of synthetically producing cyanide which consists in passing a stream of intermingled nitrogen gas and vaporized metallic compound through a mass or zone of incandescent carbonaceous material which extends completely across the path of flow of the gas or vapor, maintaining a rate of flow of the gas at a temperature throughout the zone which insures an excess of nitrogen and precludes the existence of oxygen or carbon dioxide in the zone and in the reaction gases issuing therefrom, supplying fresh carbonaceous material to replace the carbon consumed, continuously removing the products of the reaction zone, separating the cyanide from the products and repassing a part of the remaining gases through the reaction zone.

GALEN H. CLEVENGER.